June 22, 1965  J. E. HARTER  3,190,416
CLUTCH AND BRAKE POSITIONING DEVICE
Filed Nov. 29, 1963  3 Sheets-Sheet 1
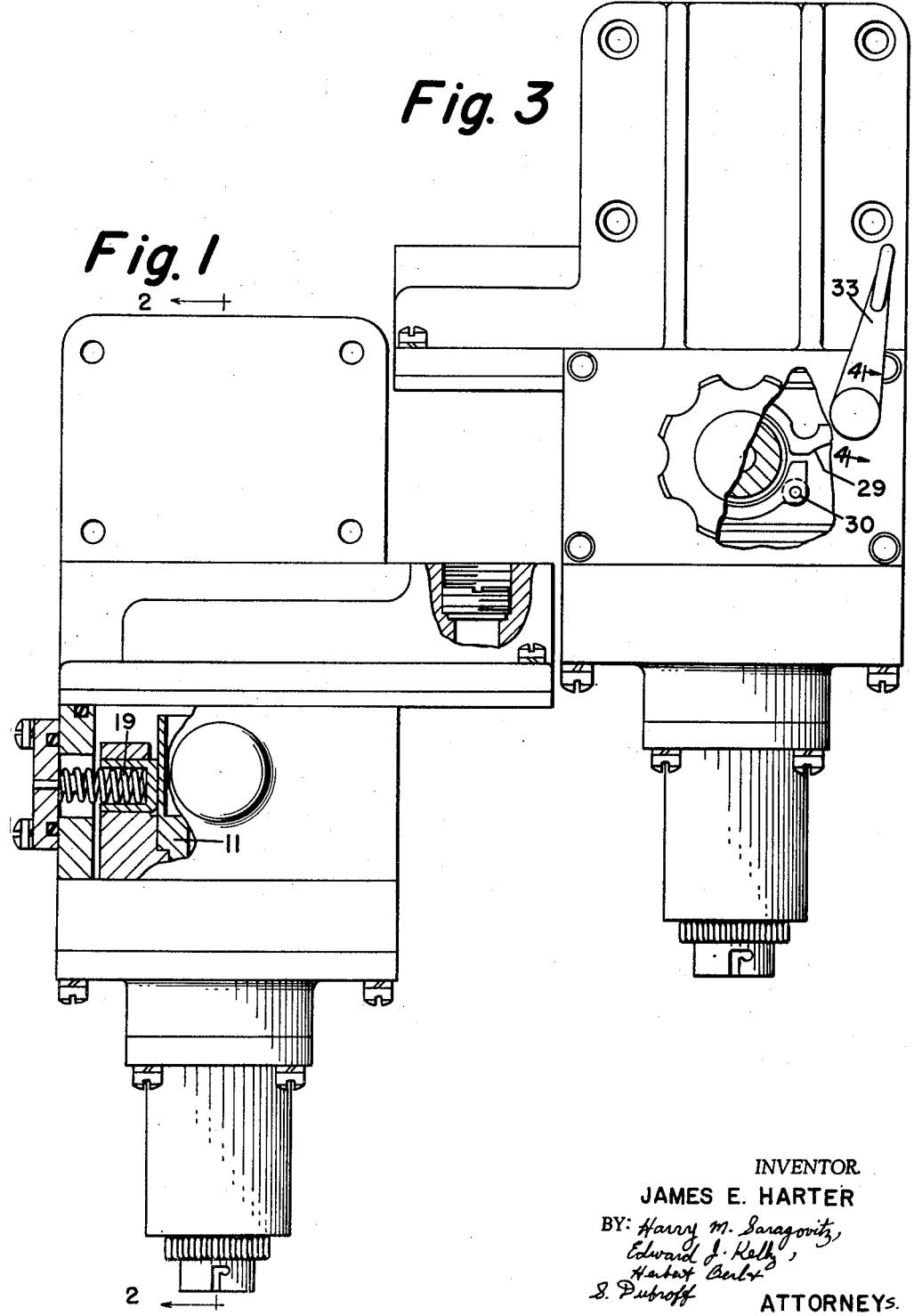
INVENTOR.
JAMES E. HARTER
BY: Harry M. Saragovitz,
Edward J. Kelly,
Herbert Berl+
S. Dubroff
ATTORNEYS.

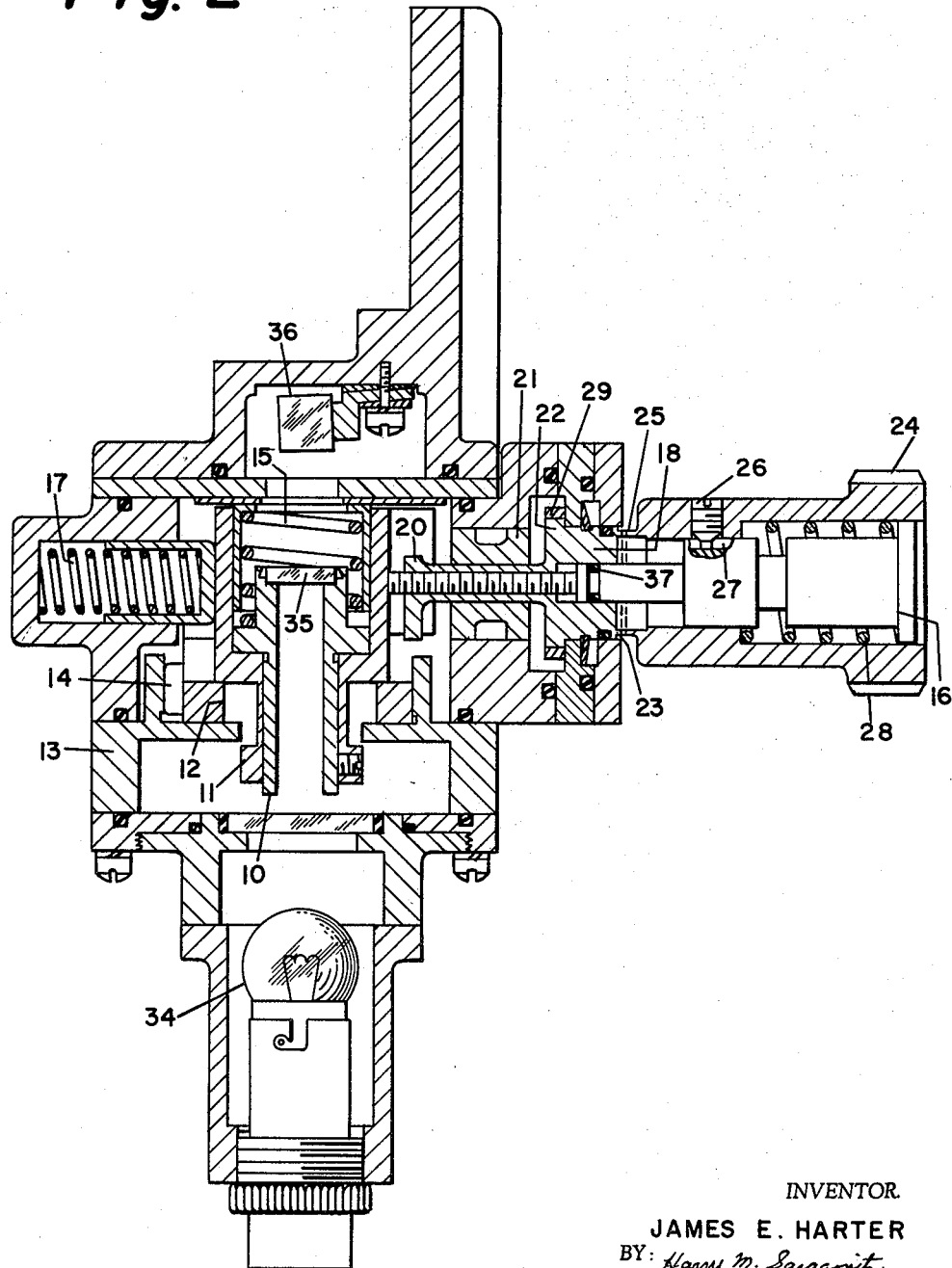

June 22, 1965  J. E. HARTER  3,190,416
CLUTCH AND BRAKE POSITIONING DEVICE
Filed Nov. 29, 1963  3 Sheets-Sheet 3

INVENTOR.
JAMES E. HARTER 3,190,416
CLUTCH AND BRAKE POSITIONING DEVICE
James E. Harter, Webster, N.Y., assignor, by mesne assignments, to the United States of America as represented by the Secretary of the Army
Filed Nov. 29, 1963, Ser. No. 327,162
2 Claims. (Cl. 192—17)

This invention relates to coordinate positioning devices such as are operated to position an object at a desired point in space. It provides an improved coordinate positioning device which is so constructed as to be operated with a facility not previously realized in the operation of such devices.

The operation of such devices usually involves the movement of the positioned object in planes which are perpendicular to one another. Heretofore these separate motions of the positioned object have been effected by control members so located with respect to one another that the operator had to refer to them in making a selection between the motions. The present invention avoids this difficulty by the provision of a single control knob and brake lever for positioning an object in two mutually perpendicular coordinate planes. As will appear, this brake lever is so related to the control knob that it can be operated by the fingers without release of the hand from the control knob. This has the important advantage that only one hand is utilized in positioning the object, selective adjustment for either of the two planes being readily effected without referring to the controls.

The invention will be better understood from the following description when considered in connection with the accompanying drawings and its scope is indicated by the appended claims.

Referring to the drawings:

FIG. 1 is a left hand view of the coordinate positioning device of the present invention, certain parts being broken away to expose interior elements.

FIG. 2 is a section taken on the line 2—2 of FIG. 1,

FIG. 3 is a right hand view of the device with certain parts broken away,

Figure 4:
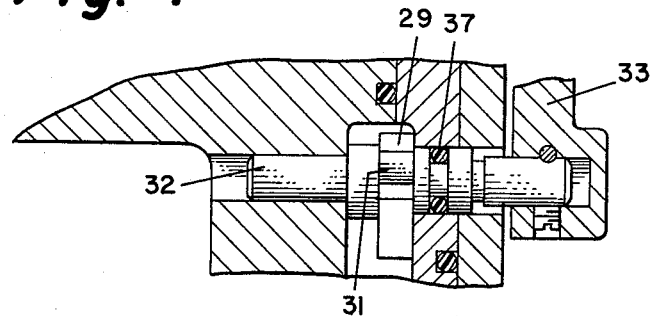
FIG. 4 is a section taken on the line 4—4 of FIG. 3.

These various figures illustrate the device as utilized to position a reticle assembly 10. This reticle assembly is supported upon a laterally movable member 11 and a longitudinally movable member 12. As can be seen from FIG. 2, the longitudinally movable member 12 is guided in its movement by a plate 13 and an insert 14, and the laterally movable member 11 is guided in its movement by the longitudinally movable member 12. As used herein, longitudinal movement is to be understood as in a direction perpendicular to the paper in FIG. 2.

The reticle assembly 10 is biased by a spring 15 into engagement with the laterally movable member 11. This ensures that any vertical displacement due to shock is immediately and automatically corrected.

Lateral adjustment of the reticle mount is effected by a force applied through a solid shaft 16 and resisted by a spring 17. Longitudinal adjustment of the reticle mount is effected by a force applied through a hollow shaft 18 and resisted by a spring 19 (FIG. 1). It will be noted that the spring 19 is loaded against the laterally movable member 11. This serves two purposes. It eliminates play tween members 11 and 12 and it loads the longitudinally movable member 12 against the force exerted through the hollow shaft 18 and an eccentric 20 which is fixed to this hollow shaft.

The hollow shaft 18 rotates in a bearing 21, has a brake drum 22 intermediate its ends, and has a fine-pitch face gear 23 at its outer end. The solid shaft 16 is threaded through the hollow shaft 18. An adjustment control member 24 has at its inner end a fine-pitch face gear 25 adapted to mesh with the face gear 23 of the hollow shaft 18 and is coupled to the solid shaft 16 by a dogpoint screw 26 which is movable axially of the shaft 16 in a slot 27. A spring 28 exerts between the solid shaft 16 and the control member 24 a force tending to maintain the face gears or axially engageable clutch members 23 and 25 in mesh so that the shafts 16 and 18 are rotated together. When the spring 28 is compressed however, the shaft 16 is rotatable independently of the shaft 18.

A brake shoe 29 (FIGS. 2, 3 and 4) encircles the brake drum 22. This brake shoe has one end fixed to a pivot 30 and the other end fixed to an eccentric section 31 (FIG. 4) of a brake shaft 32. This shaft is rotated to tighten the brake by a lever 33.

Figure 5:
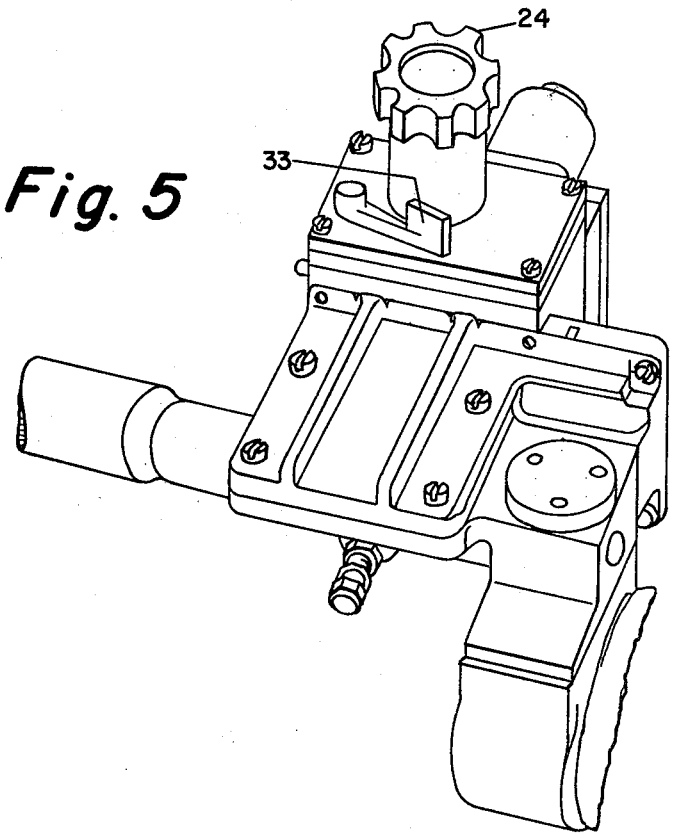
FIG. 5 is a perspective view illustrating the physical relation between the brake lever and the positioning control knob.

An important feature of the invention is the physical relation between the positions of the adjustment control member 24 and the brake lever 33. As can be seen from the perspective view of FIG. 5, the member 24 and lever 33 are so located that they can be simultaneously operated by a single human hand. This is highly advantageous where the other hand is required to perform some other function such as the aiming of a gun.

Other elements of the illustrated device are readily understandable without detailed explanation. For example it is apparent that light is transmitted from a source 34 through a reticle 35 to a rhomboid 36. It is similarly apparent that the shaft 16 is surrounded by a seal ring 37 (FIGS. 2 and 4) and that similarly illustrated seal rings are provided at junctions between the various parts of the device.

In the operation of the device, the reticle assembly 10 is adjusted longitudinally by releasing the brake lever 33 and rotating the adjustment control member 24. Therewith rotational force is transmitted through the fine-pitch face gears 23 and 25, the hollow shaft 18 and the eccentric 20 to the longitudinally movable member 12 which is spring loaded against the eccentric by the spring 19. At the same time, the rotational force of the member 24 is applied through the dogpoint screw 26 to the shaft 16 so that a static relationship is maintained between the shafts 18 and 16. This effects longitudinal motion with change in the lateral position of the reticle assembly 10.

The reticle assembly 10 is adjusted laterally by locking the brake lever 33, pulling the control member 24 against the spring 28 to disengage the gears 23 and 25, and rotating the member 24. This rotation of the member 24 screws the shaft 16 through the hollow shaft 18 against the laterally movable member 11 which is spring loaded by the spring 17. Since the eccentric 20 is fixed in position by the brake 22–29 and the shaft 16 is threaded through the shaft 18, rotation of the member 24 effects lateral movement only of member 11 and the reticle assembly 10 which is supported thereon.

After the recticle assembly 10 is positioned laterally, the brake lever 33 is released. This permits the spring 28 to force the face gears 23 and 25 into mesh with one another thereby locking the reticle assembly in the position to which it has been adjusted. Because the face gear 23 is held in a fixed position by the brake 22–29, the face gear 25 may be forced to rotate into mesh through an angle which is equivalent to one-half the angle between the face gear teeth. The pitch of the gears and the pitch of the thread on the shaft 16, however, are such that there is negligible change of the position controlling spherical end of the shaft 16 for a rotation of this shaft equivalent to one-half the pitch of the face gear teeth. The brake 22–29, of course, provides the longitudinal lock by fixing the position of the eccentric 20.

Since there are distinct operations performed to adjust for each of the coordinate motions, it is only necessary for an operator to refer to the reticle or device being moved for precise positioning. It is not necessary to refer to the controls to select the required motion, adjustment in both planes being effected with one hand.

I claim:

1. In a coordinate positioning device wherein an object positioning mount is supported upon laterally and longitudinally movable members, the combination therewith of
   a hollow shaft coupled at one end to said longitudinally movable member and having at the other end a face gear,
   a solid shaft threaded through said hollow shaft and having one end in engagement with said laterally movable member,
   a hollow control member coupled to the other end of said solid shaft and having a face gear,
   means biasing the face gear of said control member into mesh with the face gear of said hollow shaft, said control member being movable against said biasing mean to disengage said gears for rotating said solid shaft independently of said hollow shaft, and
   means including a brake member encircling said hollow shaft and a connecting actuating member for applying a braking force to said hollow shaft, said brake actuating member and control member being so located with respect to one another that they are simultaneously operable by a single human hand.

2. A device according to claim 1 wherein said braking force applying means includes
   a brake shaft having an eccentric section,
   a brake drum fixed to said hollow shaft,
   a brake shoe comprising said brake member and surrounding said drum, one end of said shoe being fixed and the other end of said shoe being controlled by said eccentric section of said brake shaft, and
   a brake lever fixed to said brake shaft, said brake lever and said control member being so located with respect to one another that they are simultaneously operable by said single human hand.

References Cited by the Examiner

UNITED STATES PATENTS

| 2,163,514 | 6/39 | Farren | 192—17 |
| 2,635,727 | 4/53 | Bitler | 192—95 X |
| 3,037,287 | 6/62 | Glatz et al. | 33—46 |

DAVID J. WILLIAMOWSKY, *Primary Examiner.*